(12) United States Patent
Seidman et al.

(10) Patent No.: US 12,472,491 B2
(45) Date of Patent: Nov. 18, 2025

(54) POSITIVE DISPLACEMENT PIPETTE SYRINGE WITH REDUCED FLUID DRAG

(71) Applicant: Mettler-Toledo Rainin, LLC, Oakland, CA (US)

(72) Inventors: Gregor Seidman, Oakland, CA (US); William Walls, Kensington, CA (US)

(73) Assignee: Mettler-Toledo Rainin, LLC, Oakland, CA (US)

( * ) Notice: Subject to any disclaimer, the term of this patent is extended or adjusted under 35 U.S.C. 154(b) by 190 days.

(21) Appl. No.: 17/852,159

(22) Filed: Jun. 28, 2022

(65) Prior Publication Data
US 2023/0415144 A1    Dec. 28, 2023

(51) Int. Cl.
*B01L 3/02*    (2006.01)

(52) U.S. Cl.
CPC .......... *B01L 3/0279* (2013.01); *B01L 3/0217* (2013.01); *B01L 3/022* (2013.01); *B01L 2200/0689* (2013.01); *B01L 2300/0838* (2013.01); *B01L 2400/0478* (2013.01)

(58) Field of Classification Search
CPC ...... B01L 3/0279; B01L 3/0217; B01L 3/022; B01L 2200/0689; B01L 2300/0838; B01L 2400/0478; B01L 3/0275
See application file for complete search history.

(56) References Cited

U.S. PATENT DOCUMENTS

| | | | |
|---|---|---|---|
| 4,099,548 A | 7/1978 | Sturm et al. | |
| 4,442,722 A | 4/1984 | Meyer | |
| 4,978,335 A | 12/1990 | Arthur, III | |
| 5,192,511 A | 3/1993 | Roach | |
| 5,620,661 A | 4/1997 | Schürbrock | |
| 5,770,160 A | 6/1998 | Smith et al. | |
| 5,947,935 A | 9/1999 | Rhinehart et al. | |
| 6,652,489 B2 | 11/2003 | Trocki et al. | |
| 6,740,295 B2 | 5/2004 | Braun et al. | |
| 6,977,062 B2 | 12/2005 | Cronenberg | |
| 7,563,249 B2 | 7/2009 | Schriver et al. | |

(Continued)

FOREIGN PATENT DOCUMENTS

| | | |
|---|---|---|
| CN | 101559389 A | 10/2009 |
| CN | 102580197 A | 7/2012 |

(Continued)

OTHER PUBLICATIONS

Eppendorf AG, Multipette E3/E3x, accessed online at https://online-shop.eppendorf.com/OC-en/Manual-Liquid-Handling-44563/Pipettes-44564/MultipetteE3-E3x-PF-135444.html, 2019, 8 pages.

(Continued)

*Primary Examiner* — Benjamin R Schmitt
(74) *Attorney, Agent, or Firm* — Standley Law Group LLP; Jeffrey S. Standley; Adam J. Smith (57) ABSTRACT

Described are exemplary embodiments of a syringe for use with a handheld positive displacement pipette. The syringe includes a piston having a piston tip that is significantly truncated in comparison to the tips of known positive displacement pipette syringes, and also shorter in length than the dispensing tip of the syringe. The design of the piston tip and its interaction with the syringe dispensing tip results in a substantial reduction in the fluid drag associated with dispensing liquid from a typical positive displacement pipette syringe.

16 Claims, 9 Drawing Sheets

(56) References Cited

U.S. PATENT DOCUMENTS

| | | |
|---|---|---|
| 7,731,908 B2 | 6/2010 | Lenz |
| 8,114,361 B2 | 2/2012 | Reichmuth |
| 8,114,362 B2 | 2/2012 | Cronenberg |
| 8,117,928 B2 | 2/2012 | Suovaniemi et al. |
| 8,277,758 B2 | 10/2012 | Mattioli |
| 8,377,396 B2 | 2/2013 | Meinicke et al. |
| 8,632,738 B2 | 1/2014 | Giribona et al. |
| 8,652,418 B2 | 2/2014 | Rempt et al. |
| 8,661,920 B2 | 3/2014 | Molitor et al. |
| 8,813,584 B2 | 8/2014 | Blumentritt et al. |
| 8,839,685 B2 | 9/2014 | Löhn |
| 9,289,762 B2 | 3/2016 | Belgardt et al. |
| 9,403,163 B2 | 8/2016 | Andres et al. |
| 9,579,644 B2 | 2/2017 | Belgardt et al. |
| 10,870,107 B2 | 12/2020 | Setzer et al. |
| 11,369,954 B2 | 6/2022 | Hill et al. |
| 11,389,792 B2 | 7/2022 | Hill et al. |
| 2001/0005490 A1 | 6/2001 | Kohrmann et al. |
| 2001/0019701 A1 | 9/2001 | Braun et al. |
| 2002/0020233 A1 | 2/2002 | Baba et al. |
| 2007/0253832 A1 | 11/2007 | Kenney |
| 2007/0297279 A1* | 12/2007 | Gao ............... B01F 33/84 366/160.4 |
| 2008/0078257 A1* | 4/2008 | Daniel ............ B01F 31/445 366/129 |
| 2010/0266454 A1 | 10/2010 | Reichmuth |
| 2011/0018525 A1 | 1/2011 | MacLean et al. |
| 2011/0072915 A1 | 3/2011 | Molitor et al. |
| 2012/0204660 A1 | 8/2012 | Löhn |
| 2013/0095508 A1 | 4/2013 | Campitelli et al. |
| 2014/0010732 A1 | 1/2014 | Belgardt et al. |
| 2014/0051182 A1 | 2/2014 | Reichmuth et al. |
| 2014/0260697 A1 | 9/2014 | Staton et al. |
| 2014/0318279 A1 | 10/2014 | Blumentritt et al. |
| 2015/0209777 A1* | 7/2015 | Petrek ............ B01L 3/0224 73/864.18 |
| 2016/0158742 A1 | 6/2016 | Belgardt et al. |
| 2017/0056603 A1 | 3/2017 | Cowan et al. |
| 2017/0151556 A1 | 6/2017 | Wilth et al. |
| 2018/0154349 A1 | 6/2018 | Habbal |
| 2018/0318825 A1 | 11/2018 | Reichmuth et al. |
| 2020/0171481 A1 | 6/2020 | Schraut et al. |
| 2020/0215529 A1* | 7/2020 | Tesch ............... B01L 3/0279 |
| 2022/0008909 A1* | 1/2022 | Petrek ............. B01L 3/0275 |

FOREIGN PATENT DOCUMENTS

| | | |
|---|---|---|
| CN | 104027875 A | 9/2014 |
| CN | 204448046 U | 7/2015 |
| CN | 108136119 A | 6/2018 |
| CN | 108479874 A | 9/2018 |
| CN | 108779428 A | 11/2018 |
| DE | 19743660 C1 | 2/1999 |
| DE | 102012016020 A1 | 2/2014 |
| DE | 202009019205 U1 | 5/2019 |
| EP | 0155087 A2 | 9/1985 |
| EP | 0584531 A2 | 3/1994 |
| EP | 0657216 A2 | 6/1995 |
| EP | 0691158 A2 | 1/1996 |
| EP | 0776247 A1 | 6/1997 |
| EP | 1344565 A1 | 9/2003 |
| EP | 1724020 A1 | 11/2006 |
| EP | 1825915 A2 | 8/2007 |
| EP | 2033712 A1 | 3/2009 |
| EP | 1724020 B1 | 3/2010 |
| EP | 2574402 B1 | 3/2015 |
| EP | 3159395 A1 | 4/2017 |
| EP | 3434373 A1 | 1/2019 |
| JP | 2011-31041 A | 2/2011 |
| JP | 4893073 B2 | 1/2012 |
| JP | 2015-221405 A | 12/2015 |
| JP | 2018-38933 A | 3/2018 |
| WO | 2015/179783 A1 | 11/2015 |
| WO | 2016/087046 A1 | 6/2016 |

OTHER PUBLICATIONS

Eppendorf, Catalog 2018, Liquid Handling, Sample Handling, Cell Handling, 2018, 207 pages, Eppendorf AG, available online at https://www.eppendorf.com/uploads/media/2018_Eppendorf_INT_Catalog_oPoIVD.compressed.pdf.

* cited by examiner

| Syringe Volume (ml) | Minimum Piston Tip Length (mm) | Maximum Piston Tip Length (mm) | Dispensing Tip Length (mm) | Approximate Piston Tip Length/Syringe Tip Length |
|---|---|---|---|---|
| 10 | 1.5 | 15.5 | 44.27 | 3.4% - 35.0% |
| 25 | 2 | 15 | 43.36 | 4.6% - 34.6% |
| 50 | 3 | 15 | 42.37 | 7.1% - 35.4% |

POSITIVE DISPLACEMENT PIPETTE SYRINGE WITH REDUCED FLUID DRAG

TECHNICAL FIELD

Exemplary embodiments of the general inventive concept are directed to non-contact dispensing syringes for use with a handheld positive displacement pipette, the design of the syringes effectuating a reduction in the fluid drag generated during a dispensing operation of the pipette.

BACKGROUND

As would be understood by one of skill in the art, a positive displacement pipette is a type of pipette wherein the piston is placed in direct contact with the liquids that are aspirated and dispensed by the pipette during use. This differs from an air displacement pipette, where an air volume separates the piston from the liquids with which the pipette is used.

In an air displacement pipette, the piston is located in the pipette body and does not normally enter the pipette tip during aspiration or dispensing of a liquid. In contrast, positive displacement pipettes utilize what is commonly referred to as a "consumable" in the form of a disposable syringe that includes not only a hollow barrel (capillary) with a tip portion, but also a piston that resides and seals within the capillary and is reciprocatable within the capillary by the pipette to aspirate and dispense a desired amount of a liquid of interest while the capillary and piston are releasably attached to the pipette. The piston also includes a piston tip that enters the tip portion of the syringe during a dispensing operation to reduce the volume of air in the syringe.

While positive displacement pipettes offer many benefits (e.g., being less susceptible to dispensing inaccuracies resulting from the effects of different liquid physical properties and/or environmental conditions), it has nonetheless been determined that entry of the piston tip into the tip section of a typical syringe during a dispensing operation may produce fluid drag that causes the amount of required fluid-dispensing force to increase to an undesirable level. This fluid drag is most pronounced at the bottom of the piston stroke, because at that point the tip of the piston has typically entered the narrowest portion of the dispensing tip and the area available for fluid travel therebetween becomes largely choked off. The limited area through which the fluid may be expelled by the piston increases the fluid drag, which may be exacerbated in certain situations since positive displacement pipettes are frequently used to dispense high density, high viscosity, and high vapor pressure liquids.

Because an increase in fluid dispensing force may result, for example, in hand fatigue in the case of hand-operated positive displacement pipettes, or exceed the capacity of motorized dispensing mechanisms in powered positive displacement pipettes, there is a need to reduce fluid drag. Exemplary positive displacement pipette syringes according to the general inventive concept meet this need by allowing for the dispensing of fluids with less fluid drag than conventional syringes.

SUMMARY

An exemplary embodiment of a positive displacement pipette syringe according to the inventive concept generally includes a generally hollow barrel (capillary) that may be of tubular shape, or some other shape such as but not limited to an elliptical or obround shape. The capillary includes a dispensing tip with a fluid passageway passing therethrough, and functions to contain a fluid specimen to be dispensed. The capillaries of exemplary syringes according to the inventive concept may be provided in a number of different volumes. A capillary of an exemplary syringe may also include an engagement feature that facilitates releasable retention of the syringe by a pipette.

Each syringe also includes a piston having a fluid-contacting portion that is arranged within the capillary. The fluid-contacting portion includes a body that seals directly or indirectly against the interior wall(s) of the capillary and an tip that is of abbreviated length in comparison to the tips of known positive displacement pipette syringes. Although not of particular importance here, the piston also normally includes a head portion that resides proximally and outside of the capillary and allows the piston to be engaged by and reciprocated by the positive displacement pipette to which the syringe is releasably attached.

Once an aspiration and dispensing operation is complete, a syringe according to the inventive concept is preferably designed to be decoupled from the positive displacement pipette to which it is attached. A given syringe may be designed to be directly manually decoupled by a user, or indirectly decoupled through use of a syringe ejection mechanism of the pipette.

An exemplary syringe according to the inventive concept facilitates the accurate and repeatable dispensing of fluids via a positive displacement pipette while minimizing fluid drag that might otherwise cause user fatigue or tax the capabilities of motorized dispensing assemblies. This also permits accurate and repeatable dispensing operations to be performed without the need to touch off the dispensing tip—meaning that the dispensing operation remains user independent, and therefore insulated from possible user-introduced error.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

As explained above, it has been discovered that in the case of a typical positive displacement pipette syringe (hereinafter also "syringe" for brevity), entry of the piston tip of the piston into the dispensing tip of the syringe during a dispensing operation may produce excessive fluid drag that results in an undesirable level of required dispensing force. As also explained, it has been found that this fluid drag is most pronounced at the bottom of the piston stroke, as the area available for fluid travel though the dispensing tip is most limited by the piston tip at that point.

Figure 1A:
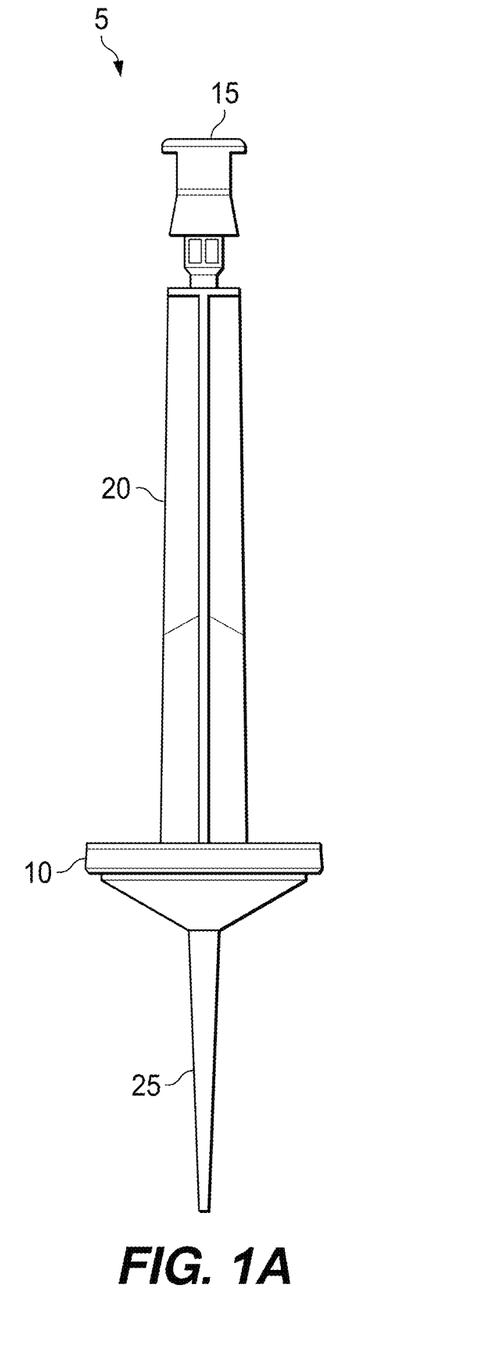
FIG. 1A depicts a known positive displacement pipette syringe piston.

In this regard, FIG. 1A depicts one example of a known positive displacement pipette syringe piston 5. As shown, the syringe piston 5 includes a body 10 that is connected to a proximally-located piston head 15 by a shaft portion 20. A piston tip 25 extends in a proximal-to-distal direction from a distal side of the piston body 10 along a central axis of the piston. The piston tip 25 is elongate and conical in shape, considerably narrower than the piston body 10, and tapering almost to a point at the distal end.

Figure 1B:
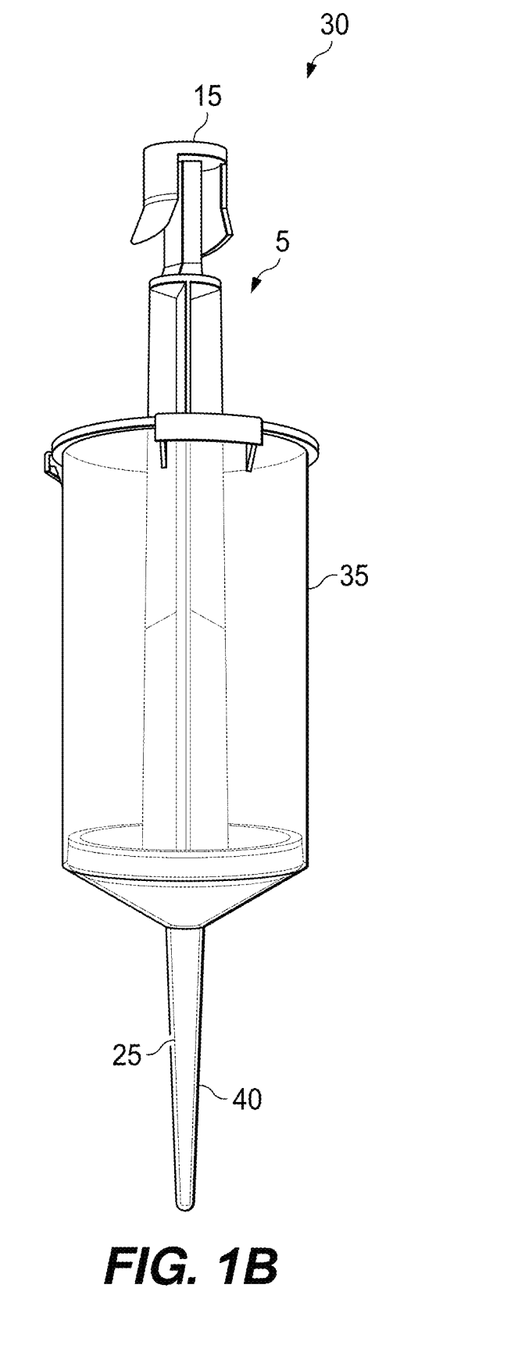
FIG. 1B depicts the known positive displacement pipette syringe piston of FIG. 1 installed to a known positive displacement pipette syringe capillary.

The known syringe piston 5 of FIG. 1A is shown in FIG. 1B as one component of a known positive displacement pipette syringe 30. As shown, the known piston 5 has been inserted into a substantially hollow and generally cylindrical capillary 35 of the syringe 30, which also includes a hollow dispensing tip 40 that is considerably narrower than the cylindrical capillary portion 35 of the syringe 30, extending axially and distally from the distal end of the capillary in a tapered narrowing fashion and substantially mimicking the shape of the piston tip.

Upon insertion of the known piston 5 into the syringe capillary 35, the body 10 is sealed against the interior wall of the capillary by a circumferential seal (not shown for purposes of clarity) and will reciprocate therein during operation, while the piston head 15 remains proximally outside of the capillary for engagement with a positive displacement pipette. In this particular example, the capillary volume is 50 ml, however, similar syringes with lesser and greater capillary volumes are also known.

As may also be observed in FIG. 1B, when the known piston 5 is installed in the capillary 35 of the known syringe 30, the tip 25 of the known piston is substantially concentrically arranged within the hollow dispensing tip 40. Although the known piston 5 is shown in FIG. 1B at the very end (bottom) of its dispensing stroke position, at least a portion of the piston tip 25 thereof will also enter or otherwise reside within a dispensing tip 40 of the known syringe 30 prior to reaching this point (see FIG. 2).

Figure 2:
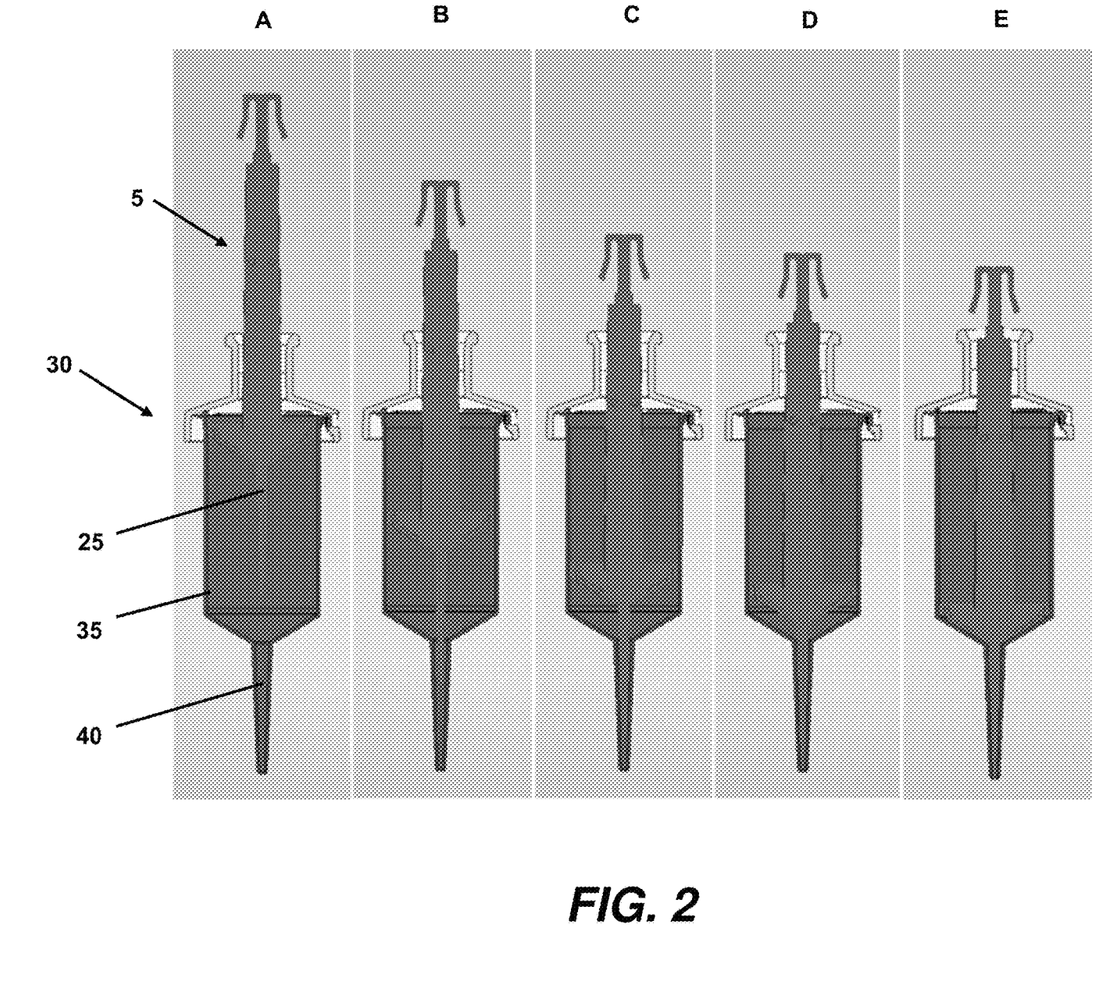
FIG. 2 schematically illustrates the progressive movement of the known piston of FIG. 1A within the capillary of the known syringe of FIG. 1B during a dispensing stroke of the piston.

FIG. 2 schematically illustrates the relative movement of the known piston 5 within the capillary 35 and dispensing tip 40 of the known syringe 30 of FIG. 1B during a dispensing stroke of the piston. Beginning with the left-most position of the known syringe 30 in FIG. 2, which is denoted as position A, it may be observed that the known piston 5 is initially located in a fully retracted position wherein a maximum volume of liquid has been aspirated into the syringe. Moving left-to-right across FIG. 2 from position A through position E, it may be further observed that as the known piston 5 is moved toward the distal end of the known syringe 30 (i.e., toward the dispensing tip 40) by a positive displacement pipette (not shown) during a dispensing operation, the piston tip 25 enters the dispensing tip 40 and travels distally therein until the piston reaches the end of its dispensing stroke. This is the bottom position of the known piston 5, and the fully dispensed position of the known syringe 30.

As the known piston 5 is moved in the manner shown in FIG. 2, the fluid in the capillary 35 is forced downward and through the dispensing tip 40 by the piston body 10. However, as the degree of piston tip 25 entry into the dispensing tip 40 increases, the amount of open cross-sectional area within the dispensing tip decreases. Given that the open area between the outside surface of the piston tip 25 and the inside surface of the dispensing tip 40 serves as the passageway through which liquid is expelled during a dispensing operation of the known syringe 30, it is the reduction in this area as the piston 5 nears the bottom of its dispensing stroke that gives rise to the identified increase in fluid drag.

Figure 3:
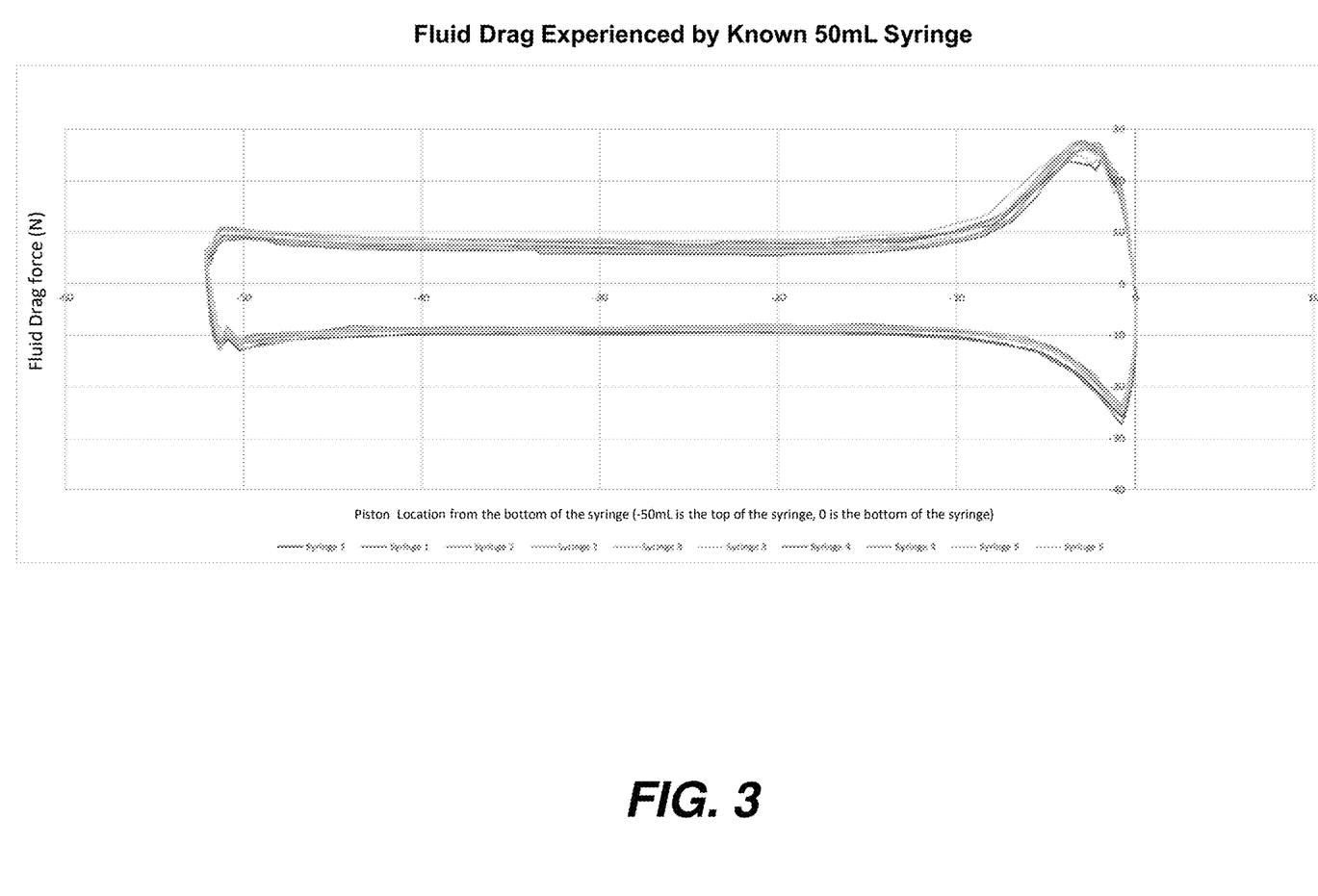
FIG. 3 graphically depicts a marked increase in fluid drag exhibited by the syringe of FIG. 2 when the piston nears and reaches the bottom of its dispensing stroke.

The significant increase in fluid drag experienced by the known syringe 30 shown in FIG. 2 is graphically illustrated in FIG. 3. As indicated therein, five of the known 50 ml syringes 30 of FIG. 1B were tested by operating each syringe in two separate aspiration and dispensing cycles. Each syringe was retracted to aspirate a full volume of fluid (water) as indicated by the −50 ml position of the piston, and then fully extended as indicated by the 0 ml position of the piston such that all of the aspirated fluid was dispensed.

The above-described increase in fluid drag is readily observable in FIG. 3. Particularly, it can be seen that the fluid drag rises from approximately 10 N over the majority of the dispensing stroke, to approximately 30 N near the bottom of the dispensing stroke, due to an increased closing off of the opening in the dispensing tip 40 by the piston tip 15.

Figure 4A:
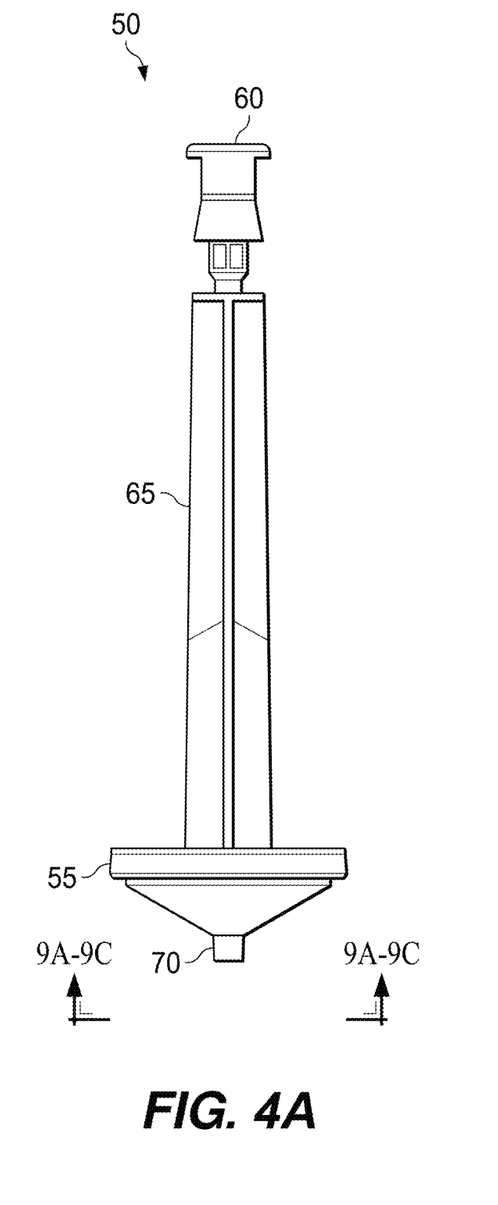
FIG. 4A illustrates one exemplary positive displacement pipette syringe piston according to the inventive concept.

Referring now to FIG. 4A, one exemplary embodiment of a fluid drag-reducing positive displacement pipette syringe piston 50 according to the inventive concept may be observed. As shown, the syringe piston 50 is similar to the known piston 5 of FIG. 1A in that the inventive piston 50 includes a body 55 that is connected to a proximally-located piston head 60 by a shaft portion 65. The exemplary piston 50 also includes a piston tip 70 that extends in a proximal-to-distal direction from a distal side of the piston body 55. However, in contrast to the known piston 5 shown in FIG. 1A, the tip 70 of the exemplary piston 50 has a very minimal length. Consequently, whereas the piston tip 25 of the known piston 5 is elongate and conical in shape, and tapers substantially to a point at the distal end, the exemplary inventive piston 50 is truncated and frustoconical in shape.

Figure 4B:
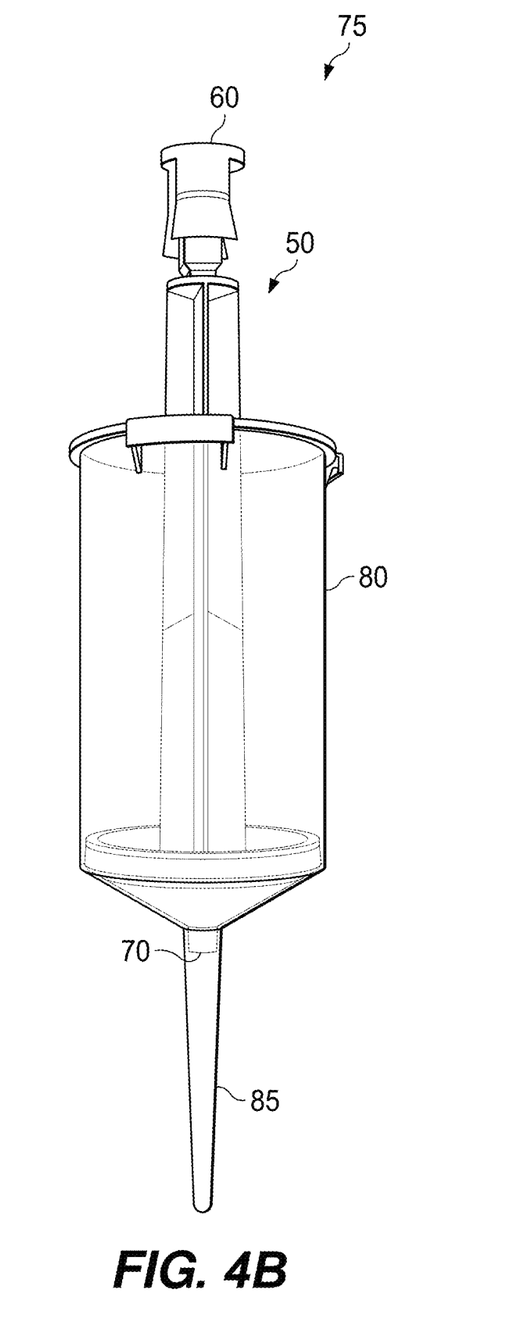
FIG. 4B depicts the exemplary positive displacement pipette syringe piston of FIG. 4A installed to an exemplary positive displacement pipette syringe capillary.

The exemplary inventive syringe piston 50 depicted in FIG. 4A is shown in FIG. 4B as one component of an exemplary positive displacement pipette syringe 75 according to the inventive concept. In FIG. 4B, the exemplary piston 50 has been inserted into a substantially hollow capillary 80 of the syringe 75, which also includes a hollow dispensing tip 85 that extends distally from the distal end of the capillary along a central axis thereof in a tapered narrowing fashion.

Upon insertion of the exemplary inventive piston 50 into the exemplary syringe capillary 80, the body 55 of the piston is sealed against the interior wall of the capillary by a circumferential seal (not shown for purposes of clarity) and will reciprocate therein during operation, while the piston head 60 remains proximally outside of the capillary for engagement with a positive displacement pipette. In this particular example, the volume of the exemplary capillary 80 is also 50 ml for purposes of illustration and comparison, however, other exemplary syringes according to the inventive concept may utilize capillaries having a lesser or greater volume.

As may also be observed in FIG. 4B, when the exemplary piston 50 is installed in the capillary 80 of the exemplary syringe 75, the truncated tip 70 of the exemplary piston only minimally enters the hollow dispensing tip 85, even when the exemplary piston 50 is at the end (bottom) of its dispensing stroke. In the case of the particular exemplary syringe 75 shown and described herein, the truncated length of the piston tip 25 is about 4 millimeters, which is approximately 9.5% of the length of the dispensing tip 85. Also, it should be understood that despite being truncated, the shape of the exemplary piston tip 25 nonetheless otherwise mimics the interior shape of the dispensing tip 85—in this case, the frustoconical piston tip 25 has a taper that corresponds to the taper of the fluid passageway in the dispensing tip 85.

Figure 5:
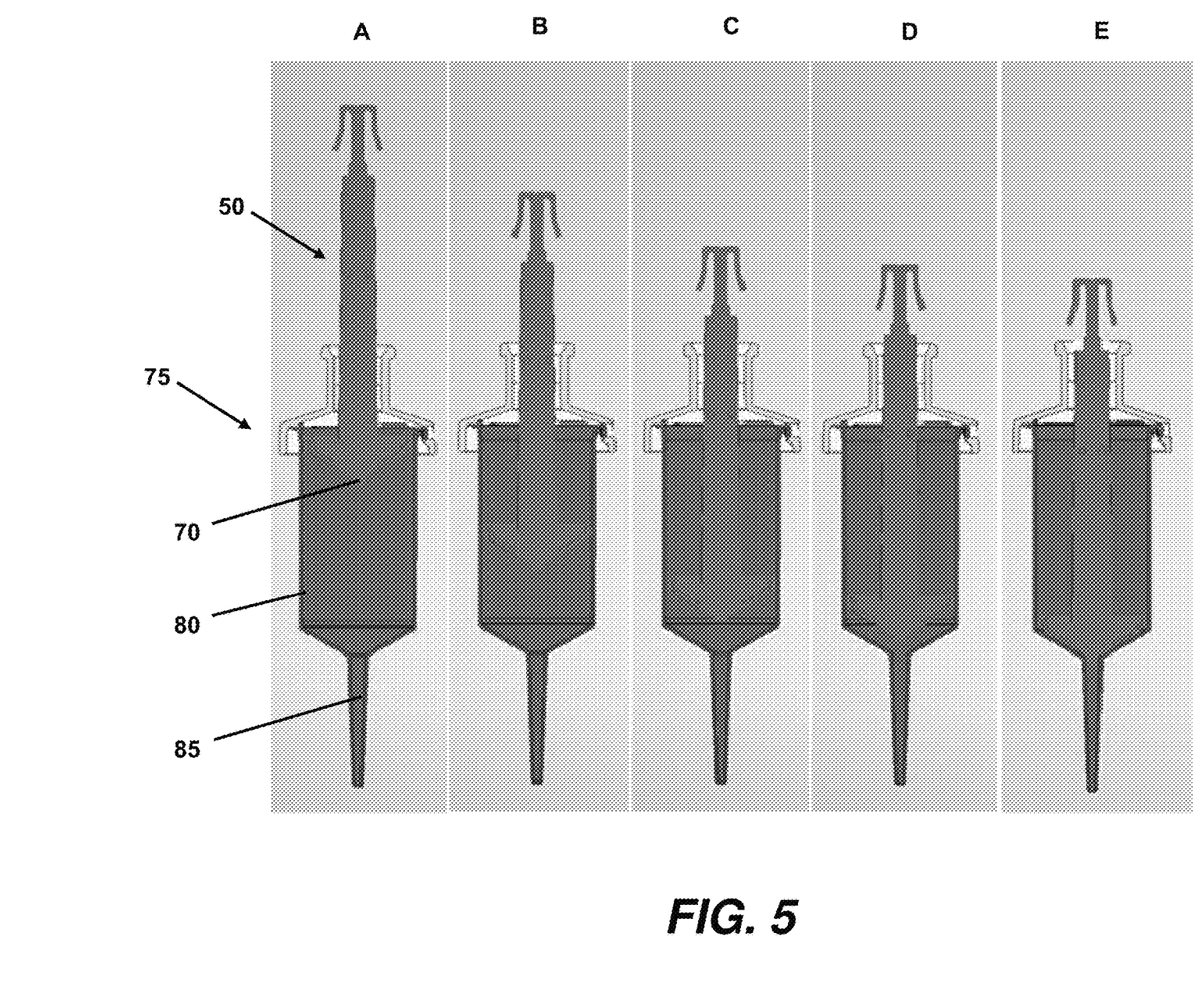
FIG. 5 schematically illustrates the progressive movement of the exemplary piston of FIG. 4A within the capillary of the known syringe of FIG. 4B during a dispensing stroke of the piston.

FIG. 5 schematically illustrates the relative movement of the exemplary inventive piston 50 within the capillary 80 of the exemplary syringe 75 of FIG. 4B during a dispensing stroke of the piston. Beginning at the left-most position of the exemplary syringe 75 in FIG. 5, which is denoted as position A, it may be observed that the exemplary piston 50 is initially located in a fully retracted position wherein a maximum volume of liquid has been aspirated into the syringe. Moving left-to-right across FIG. 5 from position A through position E, it may be further observed that as the exemplary piston 50 is moved toward the distal end of the exemplary syringe 75 (i.e., toward the dispensing tip 85) by a positive displacement pipette (not shown) during a dispensing operation, the truncated piston tip 70 does not enter the dispensing tip 85 until just prior to the fully extended (bottom) position of the exemplary piston 50 and the fully dispensed position of the exemplary syringe 75.

As can be understood from FIG. 5, as the fluid in the capillary 80 of the exemplary syringe 75 is forced downward by the dispensing movement of the exemplary piston 50, the opening through the dispensing tip 85 remains unobstructed throughout a substantial portion of the piston stroke. Even as the exemplary piston 50 nears and eventually reaches the bottom of its dispensing stroke (see positions D-E), the truncated piston tip 70 allows the fluid passageway between the outside surface of the piston tip and the inside surface of the dispensing tip 85 to remain far less restricted than the passageway of the known syringe 30 with its piston 5 in a like position. The result in a less impeded flow of fluid through the piston tip 85 and a significant reduction in fluid drag.

Figure 6:
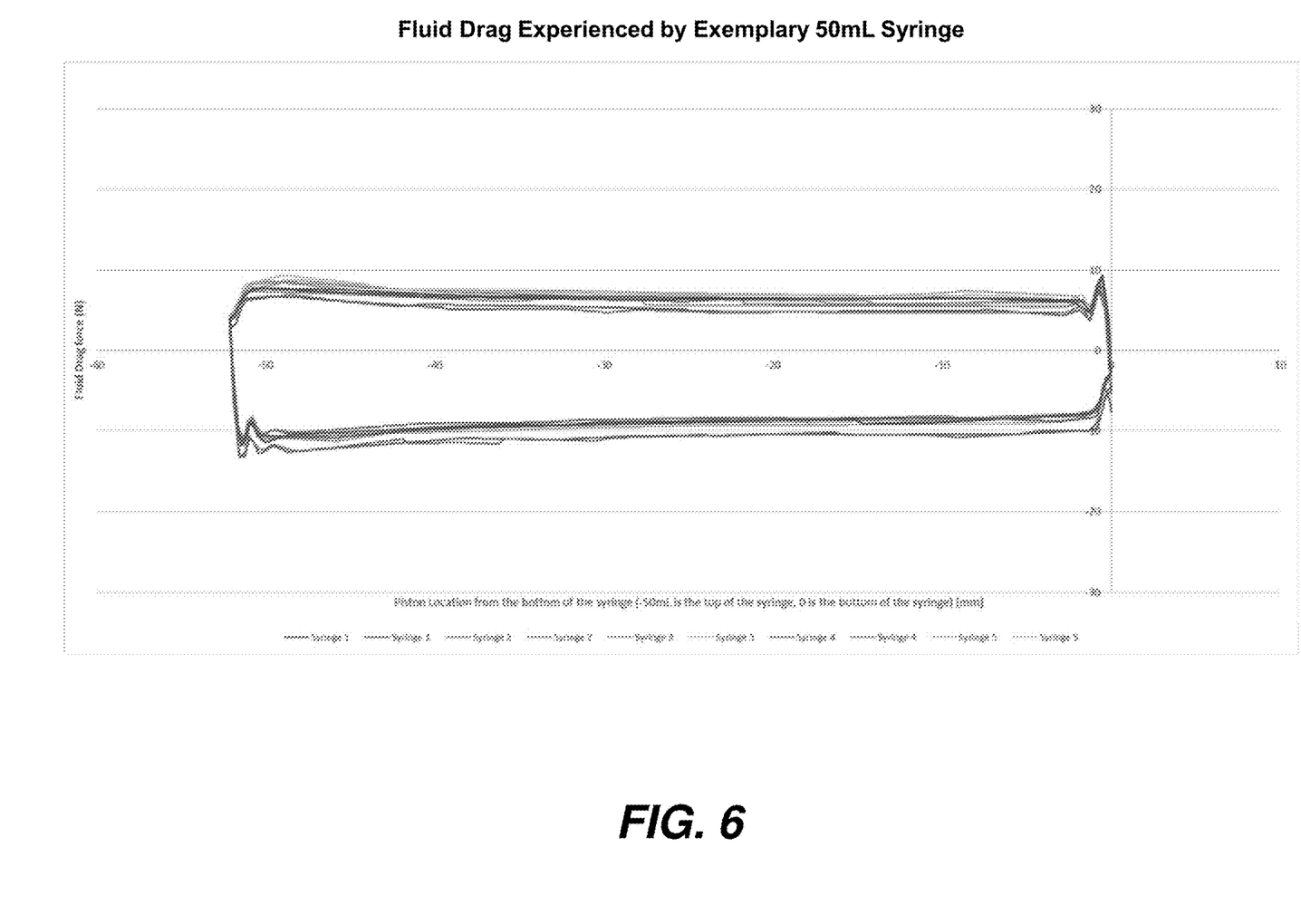
FIG. 6 graphically depicts the significant reduction in fluid drag exhibited by the syringe of FIG. 4B in comparison to the syringe of FIG. 2B when the piston nears and reaches the bottom of its dispensing stroke.

The reduction in fluid drag afforded by the piston 50 and syringe 75 design according to the inventive concept is graphically illustrated in FIG. 6. As indicated therein, five of the exemplary inventive 50 ml syringes 75 of FIG. 4B were tested by operating each syringe in two separate aspiration and dispensing cycles. As with testing of the known syringes, each exemplary inventive syringe was completely retracted to aspirate a full volume of fluid (water) as indicated by the −50 ml position of the piston, and then fully extended as indicated by the 0 ml position of the piston such that all of the aspirated fluid was dispensed.

The above-described reduction in fluid drag is readily observable in FIG. 6. Particularly, it can be seen that as the piston 50 of the exemplary syringe 75 nears the bottom of its dispensing stroke, the fluid drag is substantially equal to the fluid drag at the start of the dispensing stroke (approximately 10 N), and only very slightly greater than the fluid drag present at the very end of the dispensing stroke. Notably, the approximate 10 N fluid drag value experienced by the exemplary syringe 75 at the bottom of the piston stroke represents a reduction in fluid drag of almost 67% in comparison to the fluid drag associated with the known syringe 30 of FIG. 1B.

Such a reduction in fluid drag is ergonomically beneficial in that it reduces the amount of dispensing force an operator will need to exert on the plunger of a manual pipette with which an exemplary syringe is used. Likewise, such a reduction in fluid drag may allow for the use of a smaller motorized dispensing assembly relative to a powered pipette, which in turn facilitates a possible reduction in the size of the pipette body and may permit use of a smaller power supply or allow for longer operation per charge. In both cases, the reduction in fluid drag facilitates proper non-contact dispensing by better ensuring that all of an intended amount of fluid to be dispensed is actually dispensed without the need to touch off the dispensing tip against a vessel wall or other surface.

It has also been determined that employing a piston tip of truncated length versus completely eliminating the piston tip, helps to reduce damage to an associated syringe when the syringe is shipped with the piston already installed to the capillary. More specifically, it has been found that a truncated piston tip helps to maintain the piston in stable and proper alignment within the capillary of the syringe, even if the syringe is dropped or otherwise roughly handled. Maintaining stability and alignment is particularly important in larger syringes, such as those having for example, a capacity of 25-50 ml, when the syringe and piston combination does not include any structure to keep the piston in alignment near the proximal end of the syringe; lower capacity syringes may advantageously include structure along the length of the piston to keep the piston centered in place. In contrast, it has been found that complete removal of the piston tip may allow the piston to become misaligned in the capillary. Such misalignment may allow the piston seal to acquire a set that could subsequently compromise the seal integrity and detrimentally affect syringe operation and/or accuracy during use.

As mentioned above, while the exemplary syringe 75 is shown and described herein as having a volume of 50 ml for purposes of illustration and comparison to known syringes, exemplary syringes according to the inventive concept may be provided in other volumes (e.g. 10 ml, 25 ml). One exemplary embodiment of a 25 ml syringe according to the inventive concept is represented in the cross-sectional elevation view of FIG. 7. While the exemplary syringe 75 of FIG. 1B has a volume of 50 ml, and the exemplary syringe 100 of FIG. 7 has a volume of 25 ml, it should also be understood that exemplary syringes according to the inventive concept may be designed to accurately and repeatably dispense samples across a wide range of volumes, which may be lesser or greater than the volumes associated with the exemplary syringe embodiments described herein. For example, but not by way of limitation, syringes between 5 ml and 100 ml or more may advantageously employ the configurations described herein.

Figure 7:
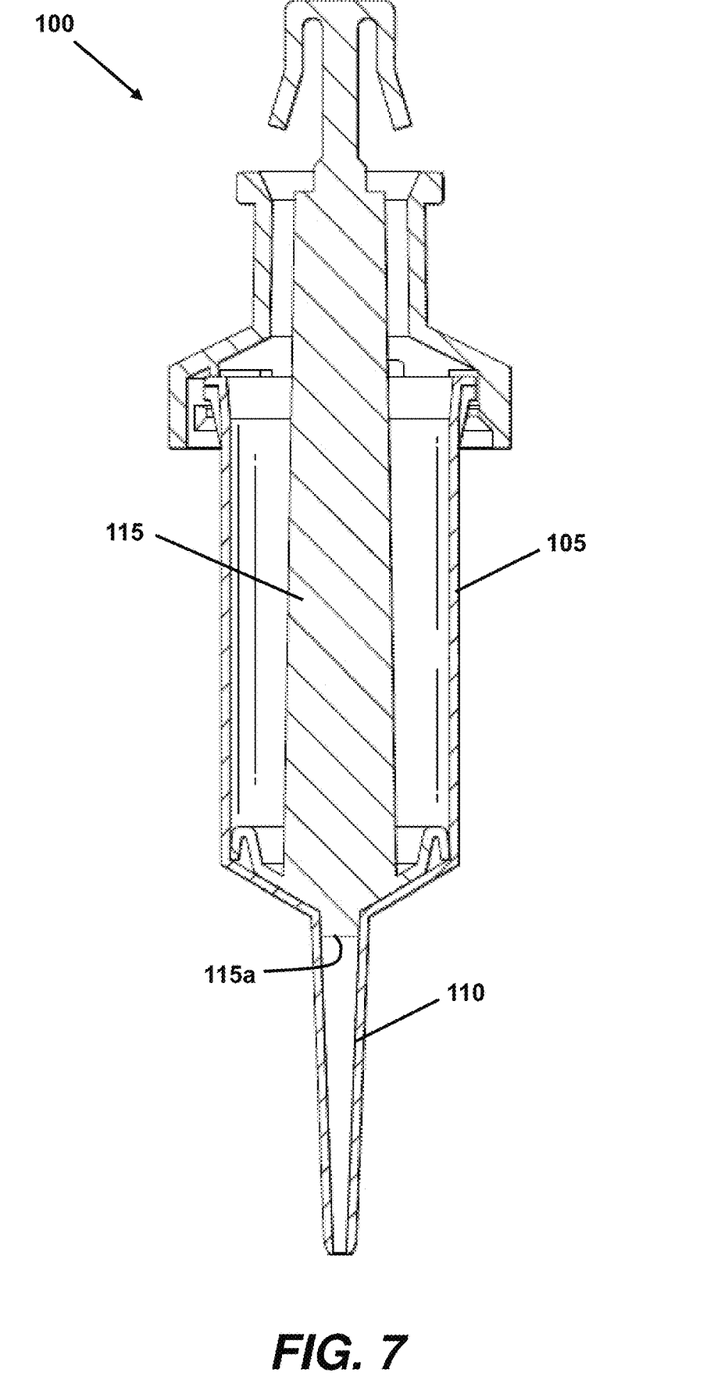
FIG. 7 is a cross-sectional side view of one exemplary 25 ml syringe according to the inventive concept.

The exemplary syringe 100 shown in FIG. 7 includes a capillary 105 which is of generally hollow and tubular construction and functions to contain the fluid specimen to be dispensed as described above with respect to the exemplary syringe 75. Similarly, a distal end of the capillary 105 also includes a dispensing tip 110 having a fluid passageway through which fluid aspirated into the capillary may be dispensed.

The exemplary syringe 100 further includes a piston 115 that is concentrically arranged within the capillary 105 for aspirating and dispensing fluid therefrom. Notably, the piston 115 of the exemplary syringe 100 of FIG. 7 also includes a truncated tip 115a similar to that of the piston 50 of the exemplary syringe 75 shown in FIG. 4B, and interacts in a like manner with its corresponding dispensing tip 110. As such, the exemplary syringe 100 exhibits a reduction in fluid drag in comparison to known syringes of like volume.

It should be understood that the piston tip of different exemplary inventive syringe embodiments may vary in length, and also that there may be an acceptable range of piston tip lengths for a given inventive syringe. For example, in the case of the exemplary 50 ml syringe 75 shown in FIG. 4B and described herein, the length of the piston tip 25 is about 4 millimeters. However, it has been determined that for the exemplary 50 ml syringe 75, an effective reduction in fluid drag and satisfactory piston stability may be achieved when the truncated piston tip length is between about 3 millimeters and about 15 millimeters. This range of acceptable piston tip lengths also corresponds to a range of approximately 7% to 35% of the length of the dispensing tip 85 of the exemplary 50 ml syringe 75.

Figure 8:
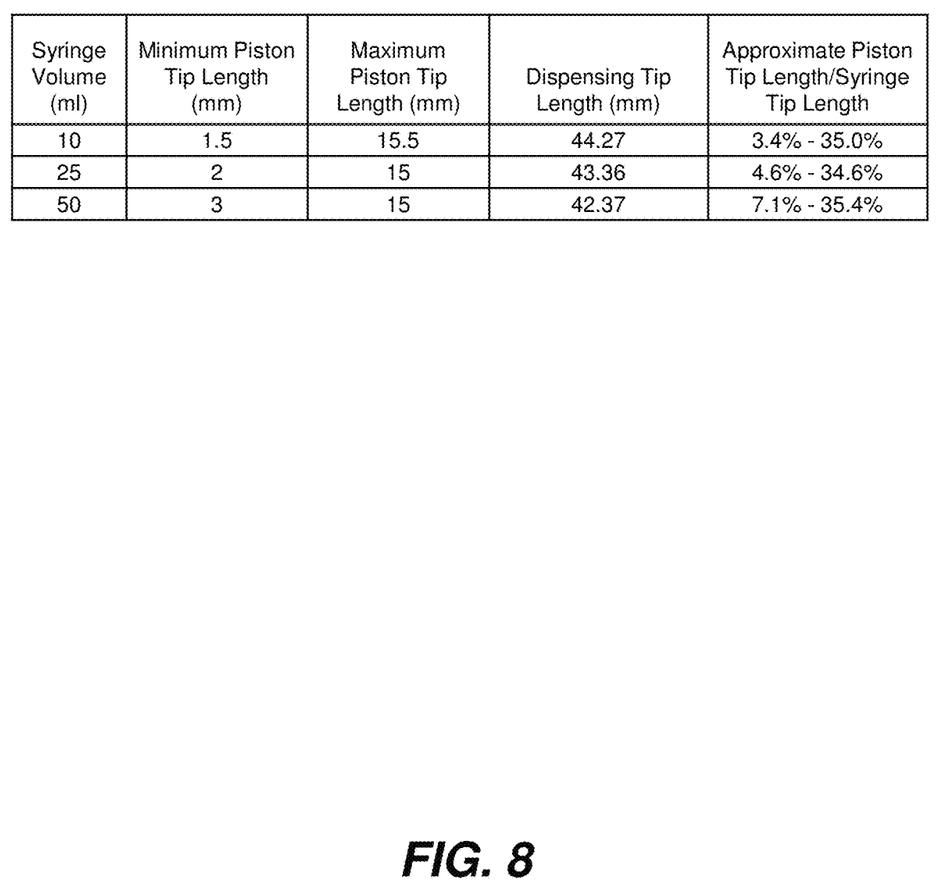
FIG. 8 presents a table of piston tip data for various exemplary and non-limiting syringe embodiments according to the inventive concept.

FIG. 8 presents a table containing tip length data for exemplary syringes having other volumes. In this case, data for syringe volumes of 10 ml, and 25 ml is provided, along with the aforementioned tip length data associated with the exemplary 50 ml syringe 75. As shown, the piston tip length and percentage of piston tip length relative to dispensing tip length may vary based on the volume of a given exemplary syringe. In all cases, however, the length of the piston tip is significantly less than the length of the dispensing (syringe) tip.

While the exemplary syringe 75 shown and described herein includes a frustoconical piston tip 70, it should also be understood that the use of other piston tip cross-sectional shapes is possible. For example, and without limitation, the piston tip of a syringe according to the inventive concept may be provided in the form of a truncated pyramid, truncated ellipse, or truncated obround shape.

Figure 9A:
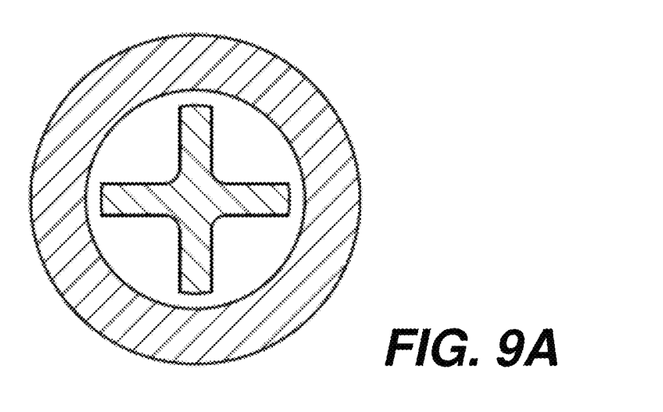
FIGS. 9A-9C illustrate several additional exemplary shapes for a piston tip according to the inventive concept.
Figure 9B:
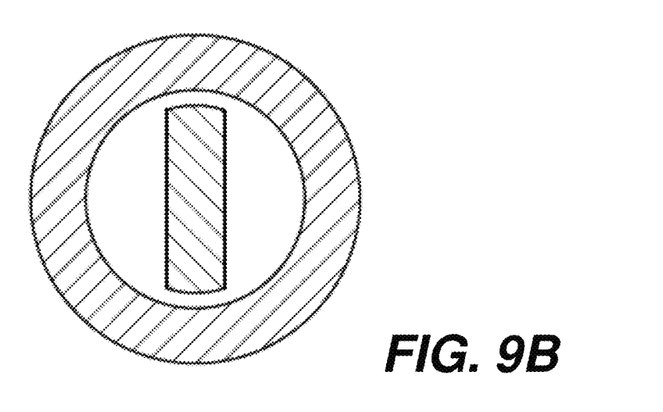
Figure 9C:
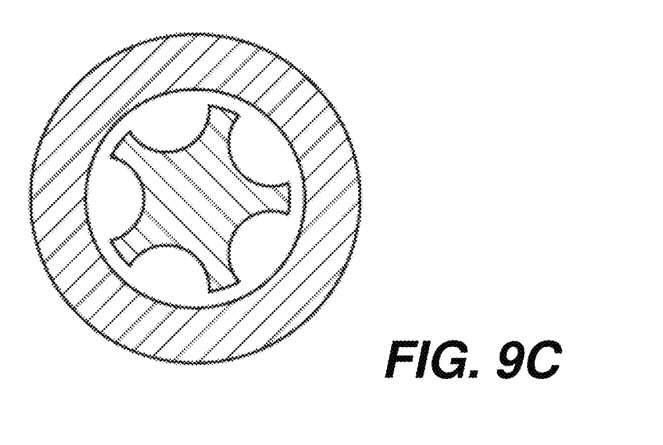

It is further possible to modify the cross-sectional shape of an exemplary piston tip to be nonuniform in nature. For example, and as represented in the axial end view of FIGS. 9A-9C, an exemplary piston tip may further have a "X" or "plus sign" shape (see FIG. 9a), a blade shape (see FIG. 9B), a pentalobular shape (see FIG. 9C), or another shape that may provide an even greater reduction in fluid drag due to less restriction of the dispensing tip fluid passageway by the piston tip. Such shapes would generally have at least some portions that remain closely adjacent to the interior of the syringe tip when the piston is at its lowest portion relative to the syringe, thereby advantageously keeping the piston in place during shipping and handling.

It should further be understood that while the exemplary inventive syringes 75, 100 presented herein for purposes of illustration are shown to have certain elements (e.g., piston heads, piston shafts) of particular design, an exemplary syringe and associated piston are not limited in that regard. For example, while each of the exemplary pistons 50, 115 of the exemplary syringes 75, 100 is shown in the drawing figures with a piston head design that is specifically designed for use with a particular handheld powered positive displacement pipette of Applicant and familiar to the inventors (see, e.g., U.S. application Ser. No. 16/664,767), it is also possible for an exemplary syringe according to the inventive concept to be provided with a different piston head that is suitable for use with a different pipette(s). Syringes and associated syringe pistons according to the inventive concept are suitable for use with various manual and powered positive displacement pipettes, and the design of mating, engaging and/or similar other elements of exemplary syringes and syringe pistons may therefore be designed accordingly.

While certain exemplary embodiments of the inventive concept are described in detail above, the scope of the inventive concept is not considered limited by such disclosure, and modifications are possible without departing from the spirit of the inventive concept as evidenced by the following claims:

What is claimed is:

1. A positive displacement pipette syringe, comprising:
   an elongate hollow capillary of a given internal volume and having a tapered dispensing tip located at a distal end thereof;
   a fluid passageway passing through the dispensing tip;
   a piston having a head portion coupled to a body portion, the body portion located in the capillary and configured for reciprocating movement therein while the head portion resides outside and proximally of the capillary;
   a piston tip extending axially from a distal side of the body portion toward the dispensing tip, the piston tip having a taper that mimics the taper of the dispensing tip and configured to reside within the fluid passageway in the dispensing tip at least when the piston is in a fully extended position relative to the capillary;
   wherein:
   the length of the piston tip is between 2% and 60% of the length of the dispensing tip;
   the piston tip is narrower than the piston body where the piston tip meets the piston body; and
   the dispensing tip is narrower than the capillary where the dispensing tip meets the capillary.

2. The positive displacement pipette syringe of claim 1, wherein the capillary has a fluid volume between 5 ml and 100 ml, inclusive.

3. The positive displacement pipette syringe of claim 1, wherein the length of the piston tip is between 1.5 mm and 25 mm.

4. The positive displacement pipette syringe of claim 1, wherein the length of the piston tip is between 3 mm and 15.5 mm.

5. The positive displacement pipette syringe of claim 1, wherein the length of the piston tip is between 3% and 35% of the length of the dispensing tip.

6. The positive displacement pipette syringe of claim 1, wherein:
   the total volume of the capillary is defined as the volume of the capillary below the location where the piston body is sealed against the inside wall(s) of the capillary when the piston is at the top of its stroke; and
   less than 10% of the total volume of the capillary remains to be dispensed by the piston when the piston tip enters the fluid passageway in the dispensing tip.

7. The positive displacement pipette syringe of claim 6, wherein for a 50 ml syringe, between 7% and 8% of the total volume of the capillary remains to be dispensed by the piston when the piston tip enters the fluid passageway in the dispensing tip.

8. The positive displacement pipette syringe of claim 1, wherein the piston tip has a frustoconical cross-sectional shape.

9. The positive displacement pipette syringe of claim 1, wherein the piston tip further has a shape selected from the group consisting of a "X" shape, a blade shape, and a pentalobular shape.

10. A positive displacement pipette syringe, comprising:
an elongate hollow capillary of a given internal volume;
a dispensing tip extending distally from a distal end of the capillary along a central axis thereof, the dispensing tip having a tapered shape that narrows in a proximal-to-distal direction;
a tapered fluid passageway passing through the dispensing tip;
a piston having a head portion coupled to a body portion, the body portion located in the capillary and configured for reciprocating movement therein while the head portion resides outside and proximally of the capillary;
a seal coupled to the body portion of the piston and sealing the body portion against the inside wall(s) of the capillary;
a piston tip extending from a distal side of the body portion toward the dispensing tip and along a central axis of the piston, the piston tip having a frustoconical shape that mimics the taper of the fluid passageway in the dispensing tip;
wherein the length of the piston tip is between 2% and 60% of the length of the dispensing tip;
the piston tip is narrower than the piston body where the piston tip meets the piston body;
the dispensing tip is narrower than the capillary where the dispensing tip meets the capillary; and
wherein the piston tip is dimensioned and configured to enter the fluid passageway in the dispensing tip prior to the piston reaching the bottom position of its dispensing stroke relative to the capillary.

11. The positive displacement pipette syringe of claim 10, wherein the capillary has a fluid volume between 5 ml and 100 ml, inclusive.

12. The positive displacement pipette syringe of claim 10, wherein the length of the piston tip is between 1.5 mm and 25 mm.

13. The positive displacement pipette syringe of claim 10, wherein the length of the piston tip is between 3 mm and 15 mm.

14. The positive displacement pipette syringe of claim 10, wherein the length of the piston tip is between 3% and 35% of the length of the dispensing tip.

15. The positive displacement pipette syringe of claim 10, wherein:
the total volume of the capillary is defined as the volume of the capillary below
the location of the seal when the piston is at the top of its stroke; and
between 7% and 8% of the total volume of the capillary remains to be dispensed by the piston when the piston tip enters the fluid passageway in the dispensing tip.

16. The positive displacement pipette syringe of claim 10, wherein the piston tip further has a shape selected from the group consisting of a "X" shape, a blade shape, and a pentalobular shape.

* * * * *